Oct. 5, 1965 R. O. BLACKER 3,209,671
FOOD COOKING AND STEAMING DEVICE
Filed Dec. 31, 1962 3 Sheets-Sheet 1
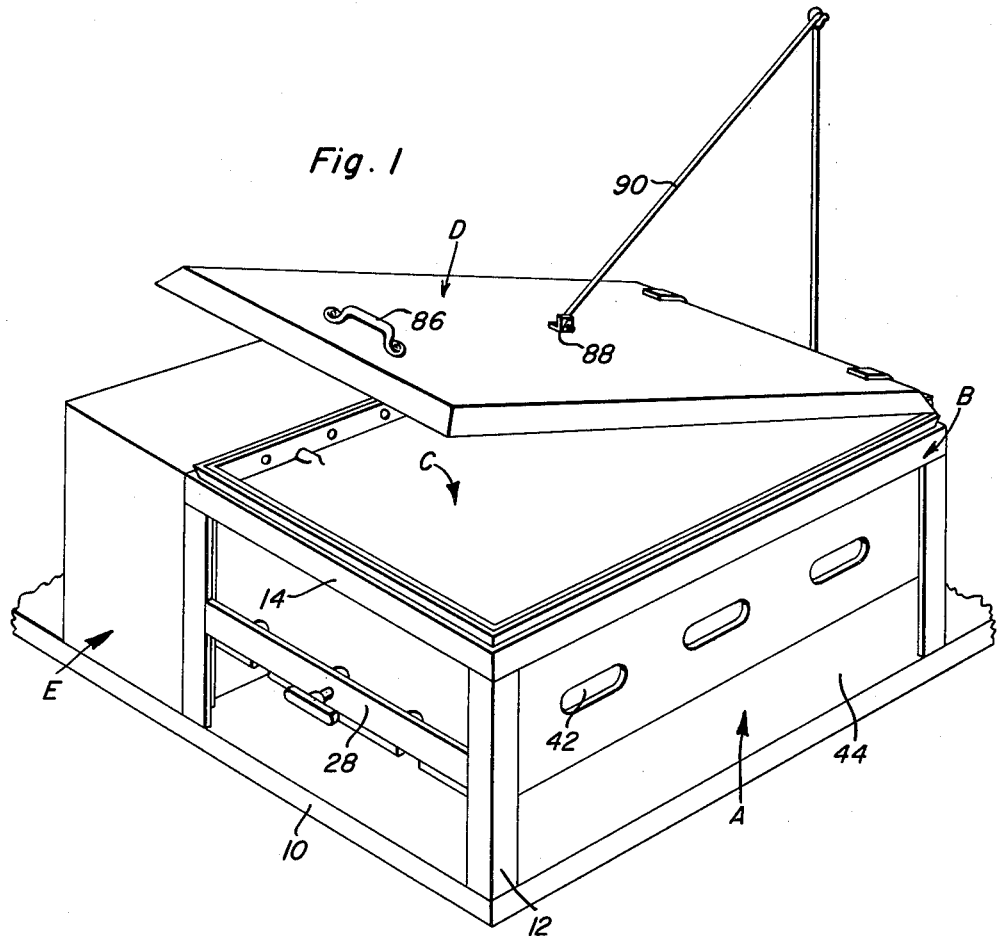
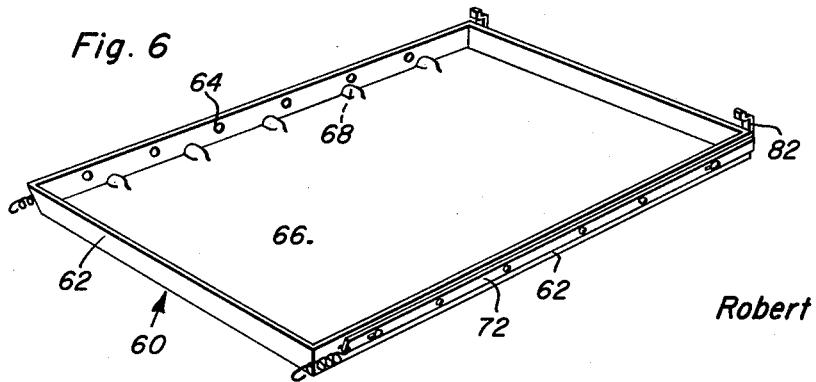
Robert O. Blacker
INVENTOR.

Oct. 5, 1965    R. O. BLACKER    3,209,671
FOOD COOKING AND STEAMING DEVICE
Filed Dec. 31, 1962    3 Sheets-Sheet 2

Robert O. Blacker
INVENTOR.

Oct. 5, 1965  R. O. BLACKER  3,209,671
FOOD COOKING AND STEAMING DEVICE
Filed Dec. 31, 1962  3 Sheets-Sheet 3

Robert O. Blacker
INVENTOR.

United States Patent Office 3,209,671
Patented Oct. 5, 1965

3,209,671
FOOD COOKING AND STEAMING DEVICE
Robert O. Blacker, 10 Rock River Drive,
Crawfordsville, Ind.
Filed Dec. 31, 1962, Ser. No. 248,440
14 Claims. (Cl. 99—234)

The present invention relates generally to a food cooking device and more particularly to a device of the kind which is operated with steam.

It is the primary object of this invention to provide a device of the character indicated wherein foods may be cooked in their own natural state, and buns and rolls may be warmed and moistened at the same time.

A further object of this invention is to provide a device of the character indicated wherein a cooking compartment is placed in direct communication with a steam generating assembly and in which steam is supplied through apertures formed in the walls of the cooking compartment.

A still further object of this invention is to provide a food warming device of the character indicated wherein said cooking compartment comprises novel means whereupon opening of said cooking compartment to the atmosphere will automatically prevent communication of the cooking compartment with the steam generating assembly.

A still further object of this invention is to provide a steam cooker of the character indicated wherein the cooker is so balanced that it automatically controls the amount of heat and steam to cook the meat and warm the buns, giving at the end of the cooking period, a meat completely done, deliciously cooked in its own juices and a hot moist bun.

A still further object of this invention is to provide a steam generating apparatus for the steam cooker wherein the amount of water being fed to the steam generating apparatus is so controlled at all times so as to regulate the heat and steam generated so as to provide for a complete control of the cooking process.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 comprises a perspective view of the food warming device comprising the subject matter of the instant invention.

FIGURE 2 comprises a sectional view taken along line 2—2 of FIGURE 5 and illustrating further details of the food warming device.

FIGURE 6 is a perspective view of the cooking compartment tray and further illustrating the closure means by which the cooking compartment can be prevented from communicating with the steam generating apparatus.

Figure 2:
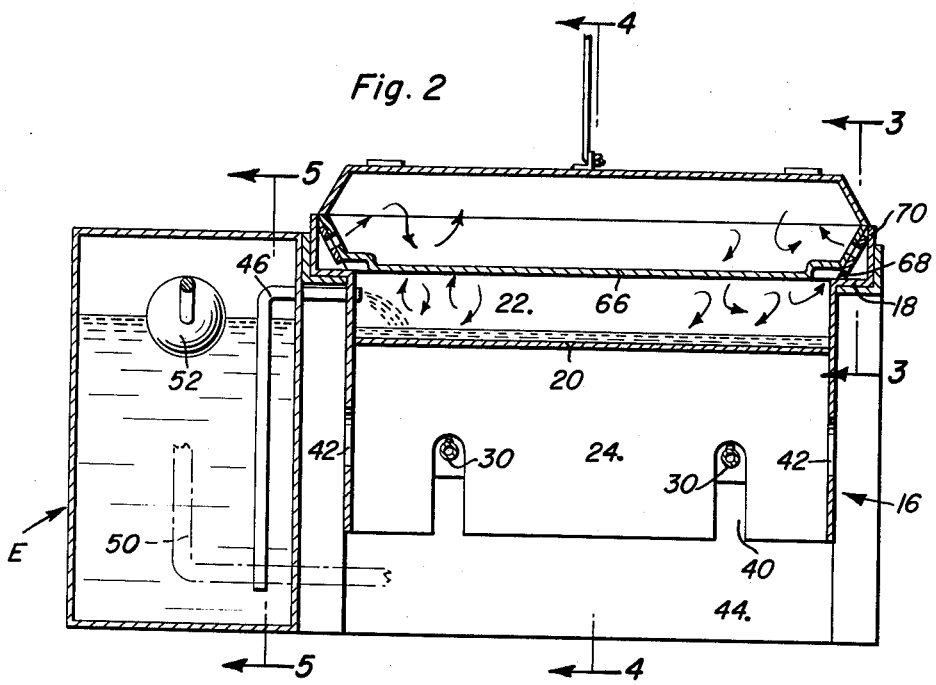
Figure 3:
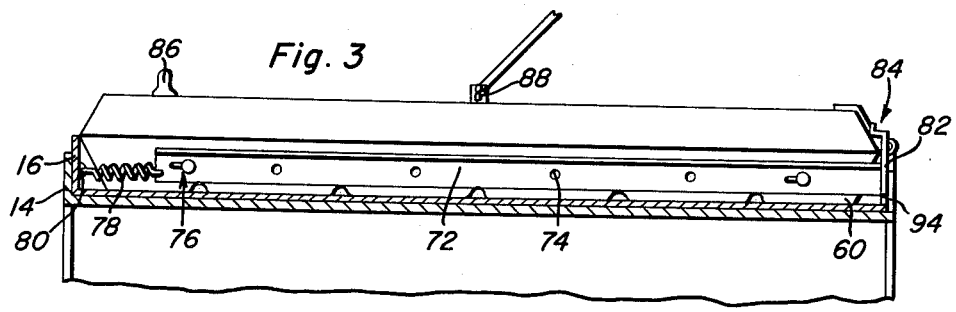
FIGURE 3 is a fragmentary sectional view taken along line 3—3 of FIGURE 2 and illustrating the means cooperating with the cooking compartment to automatically prevent steam from entering the cooking compartment upon the cover thereof being raised.

Referring now to the drawings wherein like reference numerals refer to like parts throughout the drawings, and more particularly to FIGURE 1, a steam cooker is depicted. The steam cooker is divided into a number of compartments and more particularly a gas burning compartment indicated generally by reference letter A, a water compartment B, a steam cooking compartment C, a cover or lid D which encloses the cooking compartment, and a water reservoir or tank E which forms part of the steam generating apparatus which further includes the water compartment B and the gas burner assembly compartment A.

Figure 4:
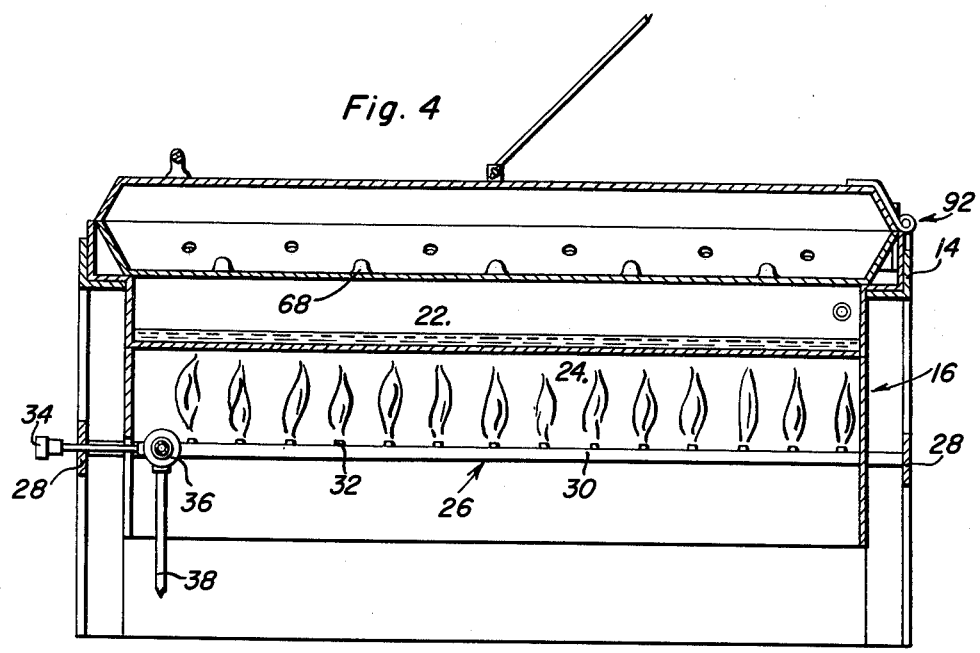
FIGURE 4 is a sectional view taken along line 4—4 of FIGURE 2 and further illustrating the details of the present invention including the burner assembly of the steam generating means.
Figure 5:
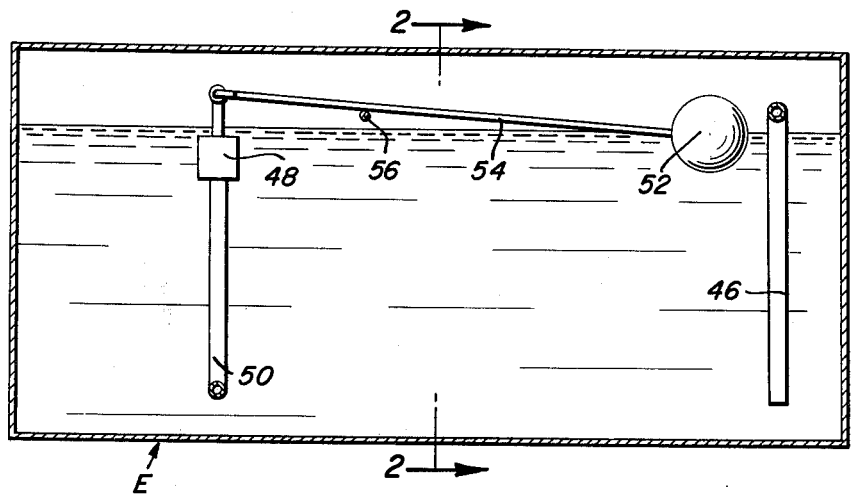
FIGURE 5 is a sectional view taken along line 5—5 of FIGURE 2 and illustrates details of the water compartment for the steam generating apparatus.

The cooker is supported upon a suitable base 10 by means of legs 12 formed of angle iron. A rectangular frame generally indicated as 14 is rigidly attached to the supporting legs 12 by any suitable means. This frame is also formed of angle iron. Removably supported by the frame 14 is a casing generally indicated at 16 for the steam generating equipment. The casing 16 is generally rectangular in cross-section and is laterally offset as shown at 18 so that the casing may be supported upon the horizontal flanges of the angle irons 14. The casing 16 has a horizontally extending plate 20 formed integral therewith and for the full length thereof dividing the casing into two compartments 22 and 24. The compartment 22 is adapted to receive water and disposed within the compartment 24 is a gas burner assembly generally designated at 26. The gas burner assembly is adapted to heat the water in the water compartment to thus generate steam. The assembly 26 is supported from the legs 12 by means of two horizontal members 28. Extending between the plates 28 are two gas pipes 30. The pipes 30 have a plurality of openings or jets 32 communicating with the interior of the chamber 24. Also supported upon one of the members 28 is a plunger 34. The plunger 34 communicates with and is adapted to open and close a gas inlet valve 36. Entering one side of the valve 36 is a gas inlet pipe 38. It should also be evident that the gas pipes 30 extend through slots 40 formed in the casing 16 to be attached to the horizontal members 28. Upon actuation of the plunger 34 gas is admitted to the pipes 30 and jets 32 through gas inlet pipe 38 and valve member 36, whereupon the gas may be ignited as shown in FIGURE 4. Also formed in the casing 16 are a plurality of vent openings 42 allowing air to enter the compartment 24 so as to form a combustible mixture with the gas being emitted from jets 32. The products of combustion may escape through the vents 42 and furthermore may leave the compartment 24 through the bottom of the cooker 44 which is open to the atmosphere.

Communicating the water chamber or tank E with the water compartment 22 of the steam generator assembly of the cooker is a tube 46. When the water level in compartment 22 is below that of the water chamber E, water will flow through tube 46 and enter compartment 22 until the water levels mentioned approach equality. It should be appreciated that a rise in the level of water in tank E above that in chamber 22 will increase the pressure of the space above the water in tank E causing it to flow through tube 46 until this pressure decreases to the pressure in the chamber 22. The pressure in chamber 22 will depend upon the temperature of the steam therein and the level of water or volume of the steam space. By maintaining a predetermined water level in the chamber E, the water level in compartment 22 can be substantially fixed and the amount of steam generated therefrom can be controlled so as to assure the proper cooking temperature and heat. The water level in chamber E is maintained constant by means of a needle valve or the like 48 controlling the inlet of water to the chamber E by opening and blocking the water inlet tube 50 to thereby also increase or decrease the pressure of the space in chamber E above the water level therein. The opening and closing of valve 48 is controlled by means of a float 52 connected to the valve 48 by means of a rod 54 which is adapted to pivot about a fixed pivot pin 56. In operation, water will flow through the water inlet pipe 50 and through valve 48 to be disposed in the water chamber or reservoir E. When the float reaches a predetermined level the rod 54 which has been pivoting about pin 56 during the rising of the water level will reach a point wherein the valve 48 communicating with the rod 54 is closed, thus shutting off the water supply through the reservoir or tank E. When the water level has been sufficiently depleted the float 52 will move downwardly causing the rod 54 to pivot and the valve 48 will be opened to allow water to again fill the reservoir or tank E. By this means a constant water level is maintained in the tank E and in the water compartment or chamber 22.

Upon the vaporization of the water in chamber 22 steam will be formed which will rise and fill the cooking compartment C, as is shown in FIGURE 2 by the path of the arrows therein. The cooking compartment is comprised of a tray generally designated as 60 and as more specifically shown in FIGURE 6. The tray 60 is generally rectangular in shape and having flanges 62 which are inclined with respect to the vertical. Formed in the longitudinally extending side flanges 62 of the tray 60 are a plurality of steam vents or apertures 64, through which steam is adapted to restrictively pass into the cooking compartment C resulting in the aforementioned rise in pressure of the compartment 22 and superheating of the steam so as to elevate the temperature of tray 60 above the boiling temperature of the water in order to cook any food thereon. Also spaced longitudinally of the tray and cut from imperforate bottom 66 and side flanges 62 thereof are a plurality of notches 68. The notches 68 are adapted to communicate with the water compartment 22 so that steam may enter therein. The steam then will flow into a space between the casing 16 and the tray 60 and through vents 64 in the side flanges 62 into the cooking compartment. It is apparent from FIGURE 2 that the tray 60 is supported upon the horizontal flanges of the offset portion of the casing 16. Of course, the tray 60 may be adapted to be wedged upon the vertical flanges 70 of the laterally offset portion of the casing 16 and the bottom 66 of the tray may be disposed in non-engaging relation with the horizontal flanges of the laterally offset portion of the casing 16. This will relieve the necessity of forming notches 68 in the bottom and side flanges of the tray 60 as the steam may pass directly from water chamber or compartment 22 to the interior of the cooking compartment C.

Figure 7:
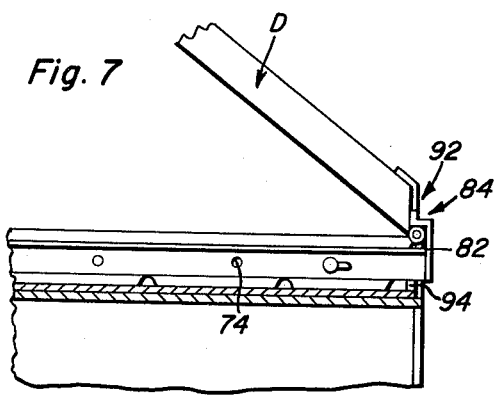
FIGURE 7 is a detail fragmentary view of the structure depicted in FIGURE 3 and illustrates the closure means in operation.

In sliding engagement with the side flanges 62 of the tray 60 are a pair of longitudinally extending valve bars 72. The bars 72 have a plurality of vents or openings 74 which when aligned with the vents or openings 64 will permit steam to enter through the vents 64 into the cooking chamber C. It is apparent however, that if the longitudinal bars are shifted so that the openings or vents 64 and 74 do not align, steam will not be permitted to enter the cooking chamber C. This longitudinal sliding or shifting of bar 72 with respect to the tray 60 will occur upon opening of the lid D of the steam cooker as will be hereinafter described below. The bars 72 are attached to the tray 60 by means of a pin and longitudinal slide connection generally designated at 76. Attached to one end of the bars is a coil spring 78 which in turn is attached to an eyebolt 80 mounted integral with the casing 16. The other end of the bar 72 has a vertically extending lug 82 formed integral therewith. The lug 82 has a laterally offset camming portion 84 at one end thereof. It should now be apparent that if the lug 82 is moved rearwardly the bar 72 will be caused to move therewith against the force of the spring 78 thus placing the vents 74 in non-aligning position with the vents 64 formed in the tray 60. This will be accomplished by opening of lid D. The lid D has a handle member 86 attached thereto so that the cooker may be opened at the proper time. Also attached to the lid D is an L-shaped lug 88 to which is attached a rope 90. The rope 90 is connected to a suitable counterweighting mechanism so that upon raising of the lid D it will remain in an open position. The lid D further has attached thereto suitable hinge members 92. From an inspection of FIGURE 7 it will be apparent that upon the pivoting of lid D to a raised position, the rear portion of the lid will strike the laterally offset cam surface of vertically extending lug 82 and will cause the same to move rearwardly through a slot 94 formed in the rear of the casing 16 and frame 14. This will cause bar 72 to move rearwardly closing off vent 64 of the tray 60 to the water compartment 22 so that no steam may enter. Upon raising of the lid D the steam in the compartment C will be allowed to escape and the cooked food may be removed therefrom. Upon closing of the lid D the bar 72 will be caused to move forwardly under the urging of spring 78 so that once again the vents 74 are aligned with the vents 64 and steam may again enter the compartment C.

To briefly summarize the operation of the device, it will be apparent that upon actuation of the plunger 34 gas may be emitted through the gas burner assembly to compartment 24 where the gas may be ignited. Water in the meantime has been admitted to water compartment 22 so that due to the flames in the compartment 24 below, the water will be vaporized forming steam in the compartment 22. The amount of steam 22 being formed in compartment 22 is kept constant as hereinbefore described to elevate the temperature of the tray 60 above boiling temperature to cook any food thereon. Steam will also restrictively flow through vents 74 and 64 into the cooking compartment C to moisten the food being cooked or heated therein. Upon raising of the lid D of the cooking compartment the bar 72 will be caused to move so that the vents 74 and 64 are no longer aligned. This will close off the steam to the cooker compartment C. Thus, the pressure above the water in chamber 22 will rise and cut-off further inflow of water through tube 46. Upon closing of the lid D the bar 72 will return to the position where the vents 64 and 74 are once again aligned and steam once again may enter compartment C causing a reduction in pressure in chamber 22 so that water inflow through tube 46 may be resumed in order to maintain the predetermined level of water in chamber 22.

It should also be noted that a fully automatic cooker has been presented which can be readily disassembled for cleaning or repair purposes and which is relatively inexpensive to manufacture.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a food cooking device, steam generating apparatus including a water compartment and a burner compartment, the burner compartment being disposed beneath the water compartment, a burner assembly disposed in the burner compartment whereupon ignition of the assembly will cause water in the water compartment to vaporize to steam, a cooking compartment communicating with the water compartment so that steam may enter therein, a lid hingedly connected to a frame member of the device and adapted to be raised and lowered with respect to the cooking compartment, a water reservoir communicating with the water compartment to maintain a predetermined body of water therein and closure means operatively connected with the cooking compartment and lid for cutting off the communication between the cooking compartment and the water compartment when the lid is raised whereby steam will be prevented from entering the cooking compartment.

2. The structure of claim 1 wherein said cooking compartment comprises a tray, said tray including upstanding side flanges and a bottom, a plurality of longitudinally spaced vents formed in said side flanges and a plurality of longitudinally spaced notches formed at the juncture of said side flanges and bottom.

3. The structure of claim 2 wherein said burner and water compartments are formed from a vertically oriented casing having laterally offset portions including a horizontal and vertical flange, partition means, said partition means dividing the casing into two compartments, the bottom of the tray of the warming and cooking compartment being supported on said horizontal flange of the laterally offset portions of the casing, the flange of the tray being sloping with respect to the vertical thereby creating a pocket between the sloping flanges of the tray and the vertical flanges of the laterally offset portions of the casing whereby steam emanating from the water compartment will pass through the notches formed at the juncture of the bottom and side flanges of the tray into the pocket and thence into the cooking compartment through the vents formed in the side flanges of the tray.

4. The structure of claim 1 wherein a tube communicates the water reservoir with the water compartment.

5. The structure of claim 4 wherein means are provided for maintaining the water level in the water reservoir and water compartment constant.

6. The structure of claim 5 wherein said means comprises a valve connected to a water inlet pipe of the reservoir, means for opening and closing said valve and a float pivotally connected to said last named means for actuating the same.

7. The structure of claim 1 wherein steam vents are formed in the cooking compartment to communicate with the water compartment and said closure means includes at least one bar member slidably disposed on the outside of the warming and cooking compartment and operatively pivotally connected with the lid and having corresponding vents adapted to align with the steam vents when the lid is closed thereby permitting steam to pass therethrough, said bar member further including solid portions adapted to overlie the steam vents when the lid is raised thereby closing the vents to the passage of steam.

8. The structure of claim 7 wherein said bar is operatively connected to the lid by a vertically extending camming lug formed integrally on one end of the bar and having a portion overlying a portion of the lid, said lid portion being sloped, the other end of the bar having means attached hereto for resisting the sliding movement of the bar whereby upon a raising of the lid the lid will contact the camming lug and move it thereby sliding the bar against the coercion of the resisting means and when the lid is closed the resisting means will return the bar to its initial position.

9. The structure of claim 8 wherein two bars are provided each of which is slidably disposed on the cooking compartment and operatively connected with the lid.

10. The structure of claim 8 wherein the resisting means is a coil spring attached to an extension of the water compartment.

11. A steam cooking device comprising, a steam generating chamber, water supply means operatively connected to the steam generating chamber for maintaining a predetermined body of water in the chamber, heating means operatively mounted below the chamber for maintaining said chamber filled with steam above the body of water therein, a heat conductive tray closing said chamber in spaced relation to said body of water for heating by said steam, closure means operatively mounted on the tray for confining a cooking space thereon, valve means mounted on the tray for establishing steam vent passages between the chamber and the cooking space to controllably elevate the temperature of the tray and the moisture content of the cooking space confined by the closure means, and means operatively connected to the valve means and engageable by the closure means for closing said vent passages in response to opening of the cooking space by the closure means.

12. The combination of claim 11 wherein said water supply means comprises, a water reservoir operatively connected to the steam generating chamber, and means responsive to variations in the level of the water and pressure in the chamber for transferring water from the reservoir to the chamber.

13. The combination of claim 12 wherein said tray includes an imperforate bottom wall in heat transfer relationship between the cooking space and the steam in the chamber, and upwardly extending side walls through which said steam vent passages extend, said valve means being movably mounted on the side walls.

14. The combination of claim 11 wherein said tray includes an imperforate bottom wall in heat transfer relationship between the cooking space and the steam in the chamber, and upwardly extending side walls through which said steam vent passages extend, said valve means being movably mounted on the side walls.

References Cited by the Examiner

UNITED STATES PATENTS

| 1,628,895 | 5/27 | McKenna | 126—20.2 |
| 2,469,778 | 5/49 | Morici | 126—369 |
| 2,719,211 | 9/55 | Lewis et al. | 99—234 |
| 2,766,366 | 10/56 | Eckhoff | 99—234 |

FOREIGN PATENTS

| 85,853 | 10/95 | Germany. |

ROBERT E. PULFREY, *Primary Examiner.*

LAWRENCE CHARLES, EUGENE R. CAPOZIO,
*Examiners.*